United States Patent [19]

Dimmick

[11] 3,724,479
[45] Apr. 3, 1973

[54] PNEUMATIC VALVE
[75] Inventor: Roger F. Dimmick, Rochester, Minn.
[73] Assignee: International Business Machines Corporation, Armonk, N.Y.
[22] Filed: May 7, 1971
[21] Appl. No.: 141,124

[52] U.S. Cl..............................137/83, 91/3
[51] Int. Cl..................G05d 16/20, F15b 5/00
[58] Field of Search.......137/83; 91/3; 251/129, 139, 251/65; 335/256

[56] References Cited

UNITED STATES PATENTS 3,621,864  11/1971  Tonegawa............................137/83
3,135,880  6/1964  Olson...............................335/256 X
3,178,151  4/1965  Caldwell..........................251/139 X
3,556,686  1/1971  Beer.....................................251/65

Primary Examiner—Alan Cohan
Attorney—Hanifin & Jancin and Keith T. Bleuer

[57]  ABSTRACT

An electrically operated pneumatic valve including a valve block having small diameter inlet and outlet jet ports transmitting an air jet across a cavity, a gate of smaller width than the cavity and movable into the cavity and across the air jet so as to interrupt the jet, an electric coil having a permanent magnet armature therein for moving the gate out of jet blocking position, and a return magnet positioned opposite the armature so as to move the armature into jet blocking position.

4 Claims, 6 Drawing Figures

PATENTED APR 3 1973　　　　　　　　　　　　　　　　　3,724,479

INVENTOR.
ROGER F. DIMMICK

BY Keith J. Bleuer

ATTORNEY

PNEUMATIC VALVE

BACKGROUND OF THE INVENTION

The invention relates to valves and more particularly to valves of the pneumatic type.

Conventional control valves, such as for liquids or gases, usually include valve spools in sealing relation with the inside surfaces of a cylindrical cavity. Such valves are quite effective for controlling fluid flow; however, they do require substantial energy for spool movement due particularly to the friction between the spools and the inside surfaces of the cavity in which the spools move.

SUMMARY OF THE INVENTION

It is an object of the present invention to provide a pneumatic valve which requires very little energy for controlling the flow of air. More particularly, it is an object to provide such a valve which is electrically controlled, the valve being so constructed that a minimum of electrical energy is necessary for actuating the valve.

In a preferred form, the valve comprises a small diameter inlet port and a small diameter output port which transmit a high velocity jet of air across a cavity so as to provide an air pressure in the outlet port for controlling desired air pressure responsive devices. The valves includes a gate which is movable into the cavity, with the gate being of smaller transverse dimension than the width of the cavity so that there is no friction between the gate and the sides of the cavity. The gate blocks the air jet when moved into the cavity so as to cause a corresponding signal in the outlet port. An electrical coil having a permanent magnet therein as the armature retracts the gate to move it out of alignment with the ports, and a return magnet in alignment with the permanent magnet armature and having its north pole in the same disposition as the north pole of the permanent magnet armature acts to move the gate into the cavity to block the outlet port, with respect to the inlet port.

The invention consists of the novel constructions, arrangements, and devices to be hereinafter described and claimed for carrying out the above-stated objects, and such other objects, as will be apparent from the following description of a preferred form of the invention, illustrated with reference to the accompanying drawings.

DESCRIPTION OF THE PREFERRED EMBODIMENT

Figure 1:
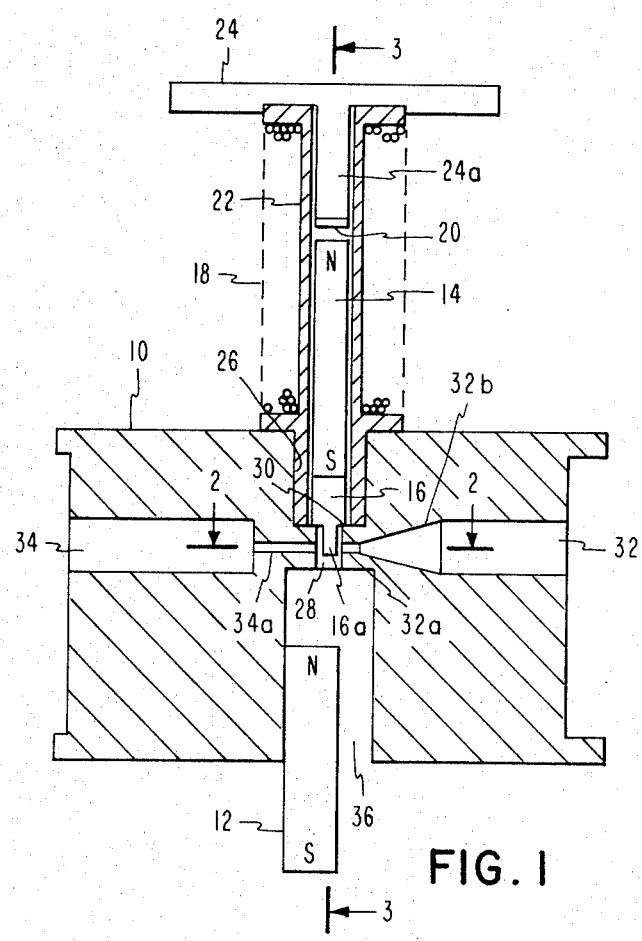
FIG. 1 is a longitudinal sectional view of a pneumatic valve incorporating the principles of the invention.
Figure 3:
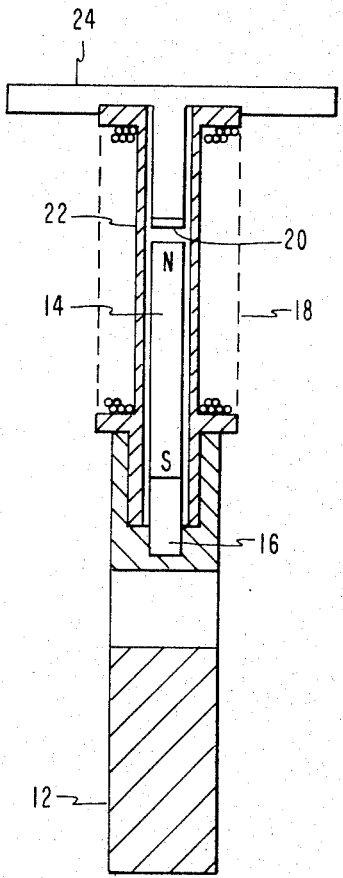
FIGS. 2 and 3 are sectional views taken respectively on lines 2—2 and 3—3 of FIG. 1.

Referring to the drawings, in which like characters refer to like parts, the illustrated pneumatic valve may be seen to comprise a control block 10, a return magnet 12, an actuator magnetic 14, an actuator gate 16, an electrical coil 18, a resilient stop 20, a bobbin 22, and a stop mounting 24.

Figure 2:
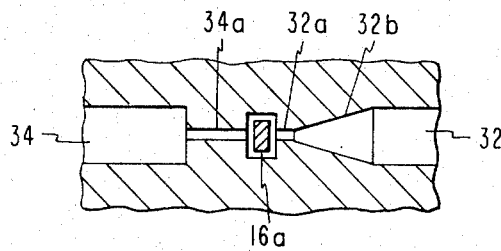
Figure 4:
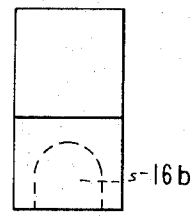
FIGS. 4, 5, and 6 are respectively side, end, and top views of the gate in the valve.
Figure 5:
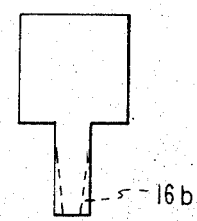
Figure 6:
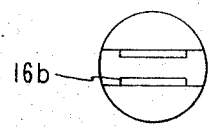

The control block 10 is provided with a cylindrical cavity 26 therein; and the bobbin 22, on which the coil 18 is wound, fits within the cavity 26 and thus mounts the coil 18 with respect to the block 10. The mounting 24 fits on the other end of the bobbin 22 and has a downwardly projecting core portion 24a that fits within the bobbin 22. The stop 20 is fixed on the lower end of the core portion 24a, such as by epoxy cement, and may be of a suitable resilient material which has a relatively slow recovery rate from impact, such as the rubberlike material known in the trade as "hypalon." The magnet 14 is loosely disposed within the bobbin 22 and slides therein as the armature of the electromagnet formed by the coil 18. The magnet 14 has its north pole up and its south pole down and within the control block 10, as shown; however, if desired, the magnet 14 may be reversed to have its north pole down. The actuator gate 16 is fixed on the lower end of the magnet 14, as with epoxy cement, and may be a plastic. The gate 16 on its lower end has a reduced thickness portion 16a that extends into a reduced diameter cavity 28 provided in the block 10 in communication with the cavity 26. The portion 16a is smaller in transverse dimension than the cavity 28, as seen in FIG. 2, so that the portion has no contact with the sides of the cavity 28; and the portion 16a on one face has a channel 16b formed therein which increases in depth toward the lower end of the portion 16a as seen in FIG. 5. The block 10 provides a retaining ridge 30 with which the gate 16 may abut, as shown in FIG. 1, for limiting the downward movement of the gate 16 with respect to the block 10.

The block 10 is provided with an inlet port 32, an outlet port 34, and an exhaust port 36. The port 36 is in communication with the lower end of the cavity 28 and extends at right angles to the ports 32 and 34, and the magnet 12 is fixed by any suitable means to the side of the exhaust port 36 as shown. The magnet 12 is in the same disposition as the magnet 14 which is with the north pole up in the illustrated form of the valve; however, the north pole of the magnet 12 will be down if the magnet 14 has its north pole down.

The inlet port 32 tapers from a relatively large diameter of 0.07 inch, for example, to a small diameter air jet supply portion 32a which may be, for example, of 0.020 inch diameter. The tapering portion of the port 32 may be designated by the reference numeral 32b. The jet port portion 32a is in communication with the side of the cavity 28, as shown. The outlet port 34 may have the same diameter of 0.07 inch, and the port 34 has a small diameter air jet reception portion 34a which is in communication with the other side of the cavity 28. The jet portion 34a of the port 34 may have the same diameter of 0.020 inch as the jet portion 32a of the port 32, and the port portions 34a and 32a are located directly in alignment with each other across the cavity 28.

Highly non-coercible material is desired for the magnets 14 and 12, and the other parts of the assembly are of nonmagnetic material so as to provide no disturbance between the interaction of the magnets 12 and 14 which will be hereinafter described.

In operation, a gas, such as air under a pressure of one or two pounds per square inch, is supplied to the inlet port 32. It may be assumed that initially the coil 18 is energized from a suitable source of EMF; and, in this case, the magnet 14 is positioned in contact with the stop 20, holding the portion 16a of the gate 16 out of alignment with the small diameter portions 32a and 34a of the ports 32 and 34. In this case, the air is increased in velocity by the tapering port portion 32b and by the port portion 32a so that the air passes as a small diameter high velocity jet from the portion 32a of the port 32 into the portion 34a of the port 34. Air under pressure is thus supplied within the outlet port 34, and any suitable gas pressure responsive device may be connected to the port 34 for sensing the air pressure in the port 34 at this time.

The coil 18 is de-energized in order to cause the air pressure within the port 34 to reduce to substantially zero. In this case, the magnet 14 and the gate 16 drop because the magnet 12 exerts a magnetic pull on the magnet 14 and also because of gravity if the valve is in its illustrated disposition, with the coil 18 being on top. The gate 16 thus moves into position on the ridge 30. The reduced thickness portion 16a of the gate 16 in this case is directly between the jet portion 32a of the port 32 and the jet portion 34a of the port 34 so that the air jet from the portion 32a is blocked with respect to the port 34. The gate 16 is provided with the channel 16b in its portion 16a which extends longitudinally of the gate 16 and which extends somewhat in the direction of the air jet from the port portion 32a due to the increasing depth of the channel 16b toward the lower end of the gate 16, and the air that jets through the portion 32a of the port 32 is thus directed downwardly and into the exhaust port 36. The air jetting along the bottom of the channel 16b functions to entrap and pick up surrounding air, so that substantially no air pressure is present in the small diameter port 34a and so that the portion of the cavity 28 in direct communication with the small diameter port 34a is in effect exhausted. Thus, although the portion 16a is loosely disposed within the cavity 28 as shown in FIG. 2, nevertheless, substantially no air under pressure passes to the port 34 and particularly to the small diameter inner end 34a of the port 34 at this time. Any sensing device therefore on the end of the port 34 at this time registers substantially zero air pressure. Thus, the high velocity stream of air passing through the small diameter portion 32a of the port 32 impinges on the gate 16 and dissipates through the exhaust port 36 in the de-energized state of the coil 18.

When the coil 18 is again energized, the gate 16 is again drawn upwardly along with the magnet 14, allowing the air jet to be again transmitted to the signal device on the end of port 34, particularly across the cavity 28 into the jet port portion 34a in direct alignment with the jet port portion 32a. The stop 20 absorbs the energy of the magnet 14 and gate 16, reducing bounce and allowing operation of the gate 16 with a minimum length stroke.

Advantageously, not only does the magnet 14 interact with the magnet 12 for causing the gate 16 to close the small diameter port portions 32a and 34a with respect to each other when the coil 18 is de-energized; but the magnet 14, being a permanent magnet, allows a 7:1 reduction in the ampere turns of the coil 18 required for operation, as contrasted to the condition in which the gate 16 would be operated by a soft iron core within the coil 18. The restore magnet 12, the movable magnet 14, and the gate 16 acting to block a high intensity air jet, provide an air valve which needs a minimum size coil 18 but yet provides a high pick time (time for the gate 16 to either block a signal in the outlet port 34 or to provide such a signal). A short stroke of the gate 16 and armature 14 provides a full signal pressure in the port 34, since only a small diameter air jet need be opened in order to provide a signal in the port 34. The gate 16 is moved at maximum acceleration until the switching motion is stopped by the physical end stops 20 and 30, and the single coil 18 is sufficient for this purpose in view of the fact that the permanent magnet 12 interacts with the magnet 14 in moving the gate 16 into port blocking position, while the upper permanent magnet 14 in the coil 18 cooperates with the coil 18 in producing a fast upward movement of the gate 16. The resilient stop 20 effectively damps the movement of the gate 16 and magnet 14 when these parts move upwardly, so that the air pressure signal remains up in the port 34 once provided to this port.

The electrically controlled air valve disclosed herein operates without a special line driver or high current relay for the coil 18, and the coil may be operated in a particular example at 50 ma and 6 volts. In this connection, it may be noted that the gate 16 is spaced from every side of the cavity 28 so that there is no frictional effect of the sides of the cavity on the gate in retarding movement thereof which would increase the required electrical current. The valve permits electronic logic signals to drive fluidic and pneumatic actuators directly, and the valve constitutes a reliable interface between electronics and fluidics. Since the permanent magnet 12 is provided to supply the main force for moving the gate 16 into port closing position, it will be apparent that the valve may be used in any disposition; and, in fact, the valve may be used with the coil 18 being on the bottom rather than the top. In the latter case, the return magnet 12 supplies enough force to the armature 14 and gate 16 to overcome gravity and the weight of armature 14, in order to move the armature 14 and gate 16 into position blocking pressure air application to port 34. The valve is advantageously simple and low cost in construction.

I wish it to be understood that the invention is not to be limited to the specific constructions and arrangements shown and described, except only insofar as the claims may be so limited, as it will be apparent to those skilled in the art that changes may be made without departing from the principles of the invention. Although I have illustrated the use of a single return magnet 12 in connection with a single armature 14 and gate 16; if a number of the pneumatic valves are positioned in tandem, side by side, a single return magnet 12 if located on a center line between the center lines of adjacent armatures 14 may be used for returning both of the armatures 14 and gates 16 fixed thereto. In the event that a plurality of pneumatic valves are positioned in tandem, in this case, alternate ones of the magnets 14 are preferably reversed in disposition with respect to each other, alternate magnets 14 having their north poles on the top and the other magnets 14 having their south poles on the top. If one return magnet 12 is used in connection with each of these magnets 14, alternate magnets 12 also are similarly reversed insofar as their north and south poles are concerned.

What is claimed is:

1. A pneumatic valve comprising:

means providing an elongate, small diameter air supply port for discharging a jet of air, means providing an elongate, small diameter air reception port in alignment with said first named port and having its air entrance end spaced from the air discharge end of said first named port, and a gate movable between the discharge end of said first named port and the entrance end of said second named port and spaced from both said port ends so as to block the air jet from said supply port to said reception port, said gate having a longitudinal channel therein in alignment with said air supply port when said gate is in blocking relation thereto, said channel increasing in depth from one end to the other so as to direct the flow of air toward the deep end of the channel and outwardly from the gate in this direction.

2. A valve as set forth in claim 1, and including an exhaust port extending substantially at right angles to said first-named ports, said channel increasing in depth toward said exhaust port so as to direct air from said air supply port to said exhaust port exclusive of said air reception port.

3. A pneumatic valve as set forth in claim 2, and including an electric coil and an armature within said electric coil and connected with said gate so as to withdraw said gate from between said air supply and air reception ports when said coil is energized, and a return magnet positioned in said exhaust port and in approximate alignment with said armature so as to move said armature and gate into the position in which said gate blocks said air reception port with respect to said air supply port.

4. A pneumatic valve comprising:

means providing an elongate, small diameter air supply port for discharging a jet of air, means providing an elongate, small diameter air reception port in alignment with said first named port and having its air entrance end spaced from the air discharge end of said first named port, a gate movable between the discharge end of said first named port and the entrance end of said second named port and spaced from both said port ends so as to block the air jet from said supply port to said reception port, a solenoid having an armature movably disposed in the solenoid and positioned on one side of said aligned air supply and reception ports, said armature constituting a permanent bar magnet and mechanically connected with said gate for moving the gate when the electromagnet is energized, and a permanent bar magnet disposed on the opposite side of said aligned air supply and reception ports and being disposed in general alignment with said bar magnet armature so as to move said armature and thereby move said gate when said solenoid is de-energized.

* * * * *